United States Patent [19]
Kaufman et al.

[11] Patent Number: 5,324,221
[45] Date of Patent: Jun. 28, 1994

[54] PERSONAL FLOATATION DEVICE

[76] Inventors: John P. Kaufman, 518 E. University Blvd., Tucson, Ariz. 85705; P. Wayne Gyllenhaal, 1949 Calle Armenta West, Tucson, Ariz. 85745

[21] Appl. No.: 63,670

[22] Filed: May 20, 1993

[51] Int. Cl.⁵ .............................................. B63B 35/74
[52] U.S. Cl. ........................................ 441/129; 472/129
[58] Field of Search ................. 441/129, 130, 125–128; 5/465; 472/129; 114/353

[56] References Cited

U.S. PATENT DOCUMENTS

| | | | |
|---|---|---|---|
| 1,462,800 | 7/1923 | Clemmer | 114/353 |
| 2,623,574 | 12/1952 | Damsch | 441/129 X |
| 5,090,695 | 2/1992 | Ciolino | 441/129 X |

FOREIGN PATENT DOCUMENTS 1049458 11/1966 United Kingdom ................... 5/465

*Primary Examiner*—Sherman Basinger
*Attorney, Agent, or Firm*—S. Michael Bender

[57] ABSTRACT

A buoyant support for a human comprises a plurality of sections for the head, upper back, and buttocks, respectively. The sections are hingedly connected to each other so that the unit may be folded into a compact package. At least two of the sections are longitudinally adjustable to each other to facilitate fitting individuals of different size. The device preferably is fabricated of a plastic cellular material to achieve desired buoyancy in water, light weight and cost effectiveness.

6 Claims, 4 Drawing Sheets

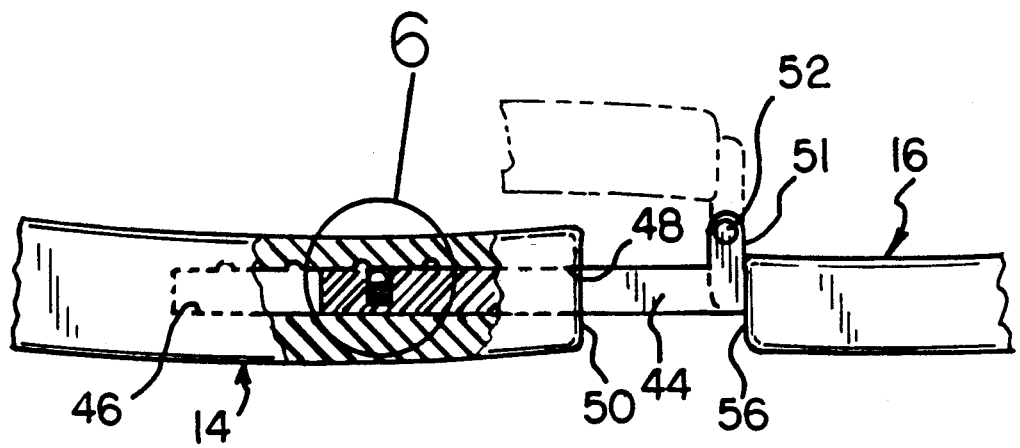
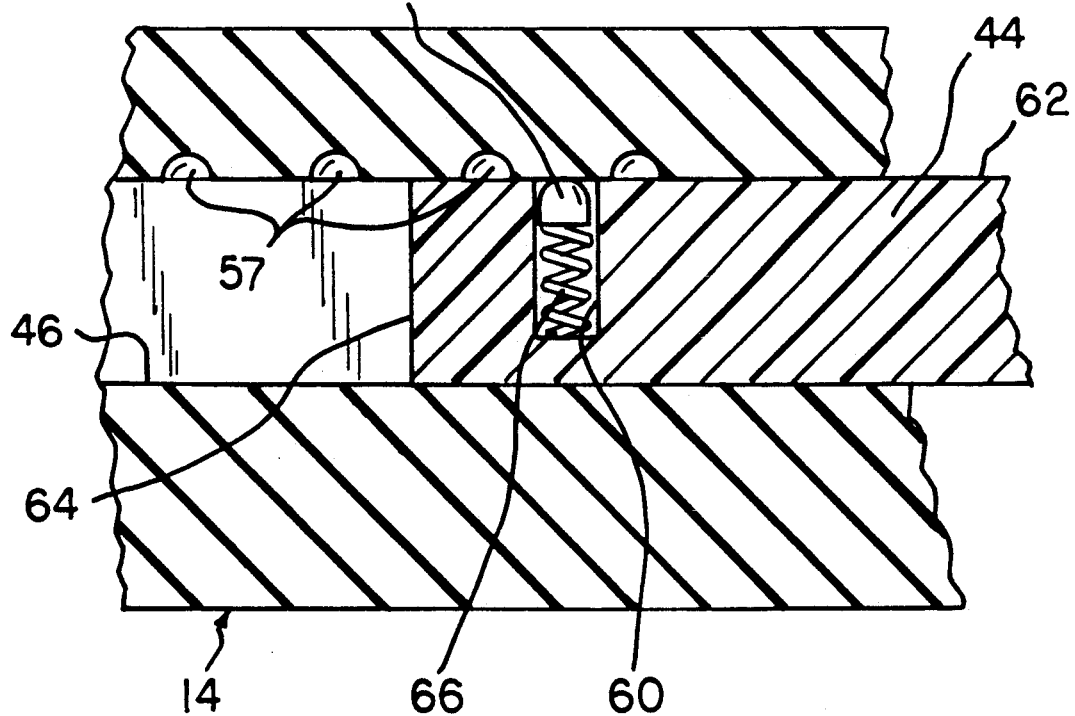

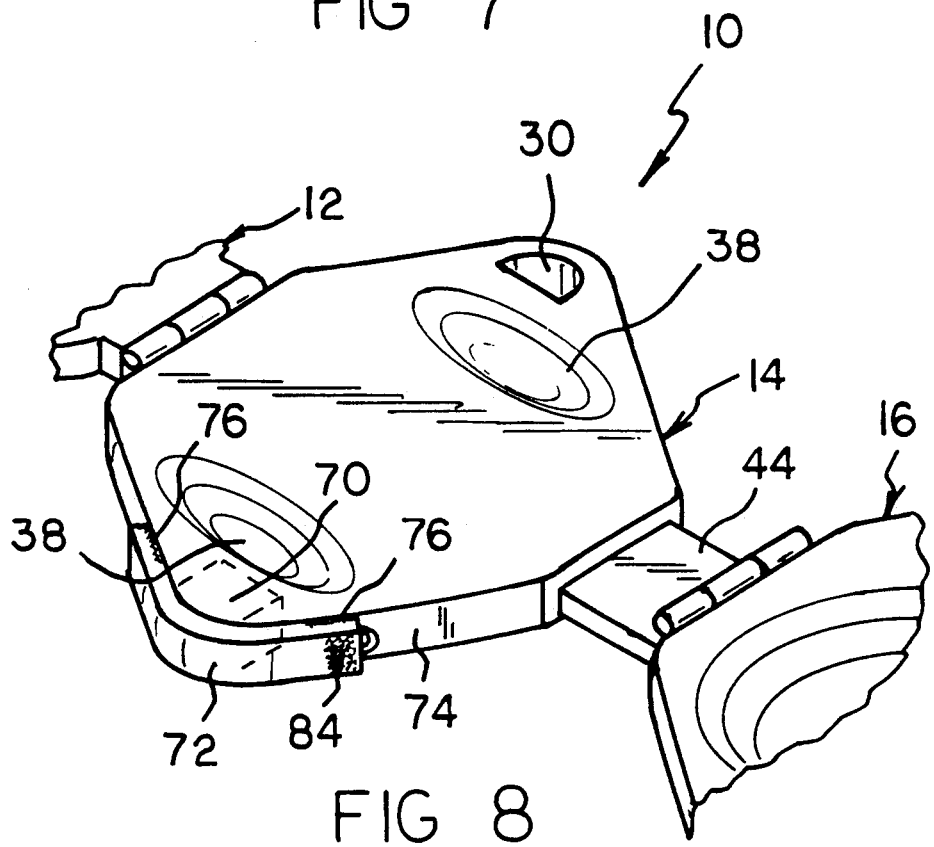
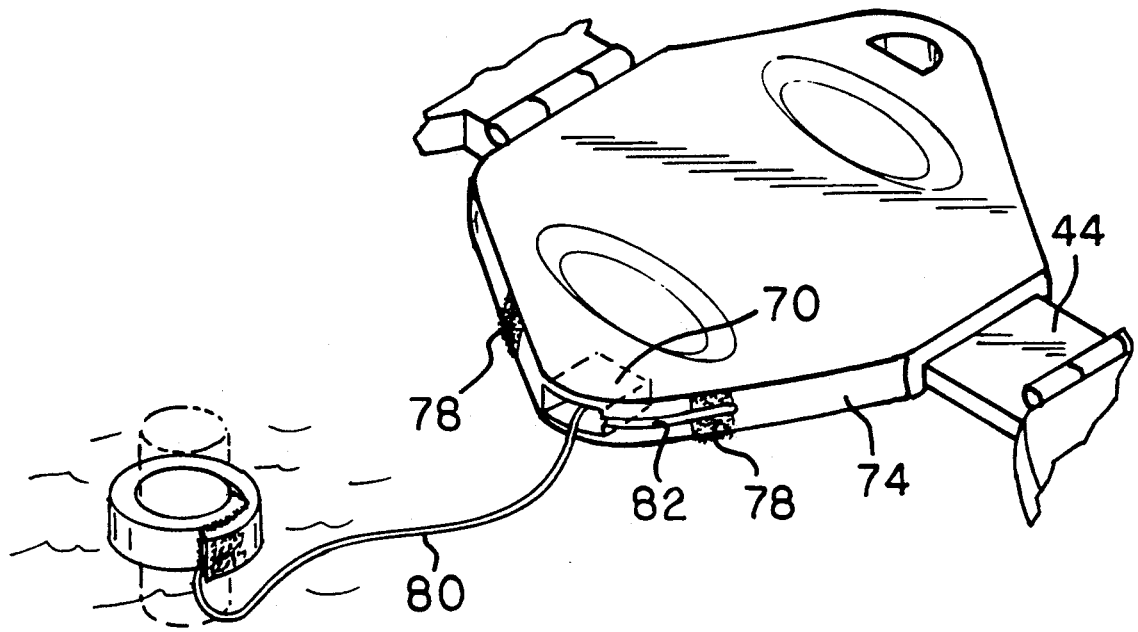

PERSONAL FLOATATION DEVICE

BACKGROUND OF THE INVENTION

1. Field of the Invention

The present invention relates generally to floatation devices, and more particularly, to a portable floatation device especially adapted to support a human on the surface of a body of water.

2. Description of the Prior Art

Personal floatation devices capable of supporting a human in water, or helping a swimmer stay afloat, are generally well known. For example, a variety of such devices are shown in the following U.S. Pat. Nos. 4,276,670 (clam shell design attached to a swimmer by straps); 4,302,860 (floating shell structure adapted to support a swimmer chest-down); 4,662,851 (rectangular float having hinged sections which permit flexing in response to wave motion); 4,964,827 (device positioned on the upper arm and having projections which can be grasped in an emergency); and 309,169 (rectangular float having a raised end portion for the head of a swimmer).

It will be seen that each of the prior patented devices mentioned above comprises a relatively bulky device, or is unnecessarily complicated and therefor relatively expensive to fabricate. It is apparent therefore that a need exists for a personal floatation device capable of efficiently supporting a human on the surface of water, yet which offers the additional advantages of being adjustable to fit swimmers of varying size, and of being foldable into a compact easy-to-carry article when not in use, all in a simple, relatively inexpensive design.

The foregoing need is met by the present invention as will be made apparent from the following description thereof. Other advantages of the present invention over the prior art also will be rendered evident.

SUMMARY OF THE INVENTION

To achieve the foregoing and other advantages, the present invention, briefly described, provides a buoyant support for a human comprises a plurality of sections for the head, upper back, and buttocks, respectively. The sections are hingedly connected to each other so that the unit may be folded into a compact package. At least two of the sections are longitudinally adjustable to each other to facilitate fitting individuals of different size. The device preferably is fabricated of a plastic cellular material to achieve desired buoyancy in water, light weight and cost effectiveness.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved personal floatation device which has all of the advantages of the prior art and none of the disadvantages.

It is another object of the present invention to provide a new an improved personal floatation device which may be easily and efficiently manufactured and marketed.

It is a further objective of the present invention to provide a new and improved personal flotation device which is of durable and reliable construction.

An even further object of the present invention is to provide a new and improved personal floatation device which is susceptible of a low cost of manufacture with regard to both materials and labor, and which accordingly is then susceptible of low prices of sale to the consuming public, thereby making such personal floatation device available to the buying public.

Still yet a further object of the present invention is to provide a new and improved personal floatation device having a plurality of sections hinged to one another.

It is still a further object of the present invention is to provide a new and improved a new and improved personal floatation device having a plurality of sections hinged to one another and foldable with respect to each other to form a compact easy-to-carry article.

Still yet a further object of the present invention is to provide a new and improved personal floatation device having a plurality of sections hinged to one another wherein at least two of the sections are connected to each other by means of a longitudinally adjustable member so as to permit the floatation device size to be adjusted to fit swimmers of different size.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 5 is a partial side view in elevation of the first preferred embodiment of the invention as viewed along line 5—5 of FIG. 2.

FIG. 6 is an enlarged detail in elevation of a portion of FIG. 5.

FIG. 7 is a perspective view of a portion of the second or alternatively preferred embodiment of the personal floatation device of the invention.

FIG. 8 is a perspective view of a portion of the second or alternatively preferred embodiment of the personal floatation device of the invention showing the auxiliary beverage float employed therewith.

DESCRIPTION OF THE PREFERRED EMBODIMENT

Figure 1:
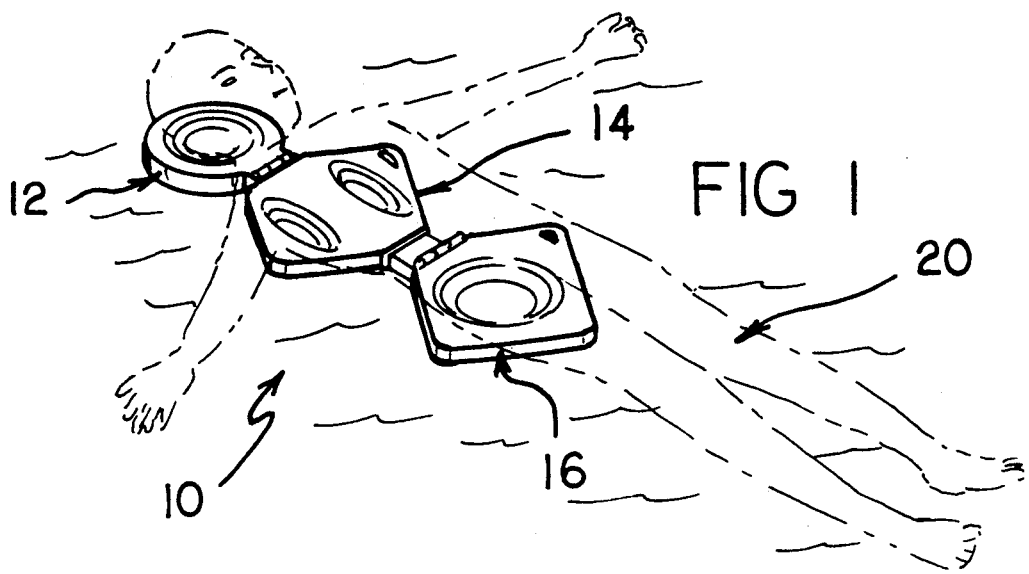
FIG. 1 is a perspective view showing the first preferred embodiment of the personal floatation device of the invention.

With reference now to the drawings, a new and improved personal floatation device embodying the principles and concepts of the present invention will be described.

Turning initially to FIGS. 1 through 4, there is shown a first exemplary embodiment of the personal floatation device of the invention generally designated by reference numeral 10. In its first preferred form, personal floatation device 10 comprises three sections of buoyant material generally designated by reference numerals 12, 14, and 16, respectively. Section 12 generally is round in shape and is adapted to support the rear or back of the head of a swimmer whereas sections 14 and 16 are generally diamond shaped and are adapted to support the upper back and the buttocks of a swimmer when the latter (indicated by broken lines and reference numeral 20 in FIG. 1) is lying face up on the floatation device 10 on the surface of a body of water substantially as illustrated. The overall size and thickness of each section are not critical, suffice it to say, the three sections together have sufficient buoyancy and/or buoyant material to enable the device to serve as a float for an average size human adult on the surface of a body of water, such as for example, a swimming pool. In this regard, it will be noted that in the preferred embodiment, sections 14 and 16 are of substantially the same size whereas section 12 is somewhat smaller than the other two sections in overall size.

Figure 3:
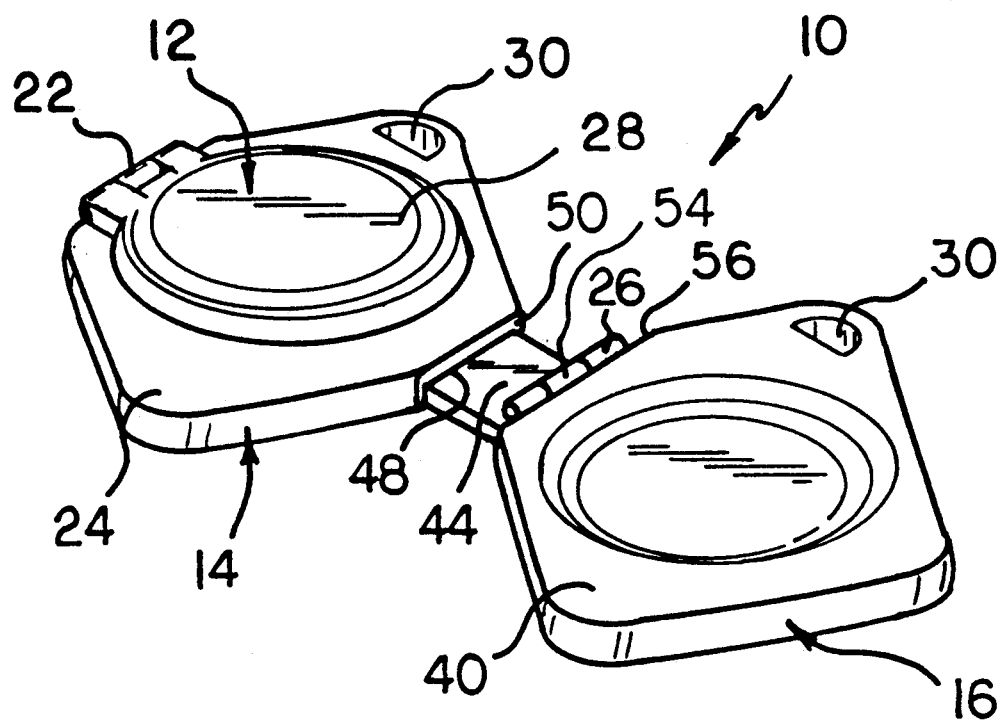
FIG. 3 is a perspective view showing the device of FIG. 2 in a first folded condition.
Figure 4:
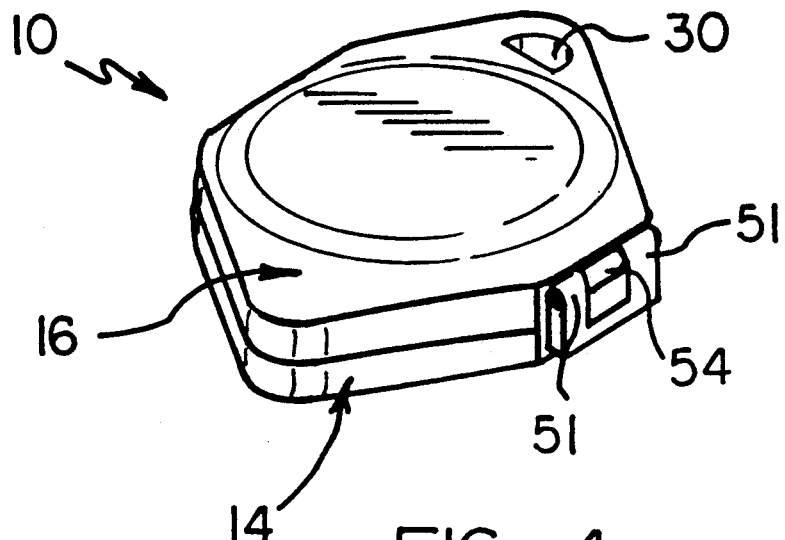
FIG. 4 is a perspective view showing the device of FIG. 2 in a second folded condition.

Section 12 is hinged to section 14 by a first hinge assembly 22 so that section 10 may be folded about the hinge axis defined by first hinge assembly 22 and lie flat upon the upwardly facing surface 24 of section 14 (FIG. 3). Similarly, section 16 is hinged to section 14 by a second hinge assembly 26 so that it may be folded about the hinge axis defined by second hinge assembly 26 and lie flat against the rear surface 28 of section 12 and the peripheral portions of the upwardly facing surface 24 of section 14. When so folded (FIG. 4), floatation device 10 forms a compact article easy to carry and easy to store in a limited space. To facilitate carrying the folded floatation device 10, a pair of hemsisphereically-shaped through holes each designated by reference numeral 30 are located in the same relative position on the corresponding lateral or wing portions of diamond-shaped sections 14 and 16 such that when section 16 is folded about sections 12 and 14 as aforesaid, the holes 30 are in registration with each other to thereby form a convenient integral carrying handle. It will be appreciated that when the floatation device is unfolded a separate handle will exist in each of sections 14 and 16 by virtue of the hemispherical shaped holes or apertures 30 which separate handles facilitate positioning of the unfolded floatation device on the surface of a body of water (e.g. a swimming pool) as will now be apparent.

Figure 2:
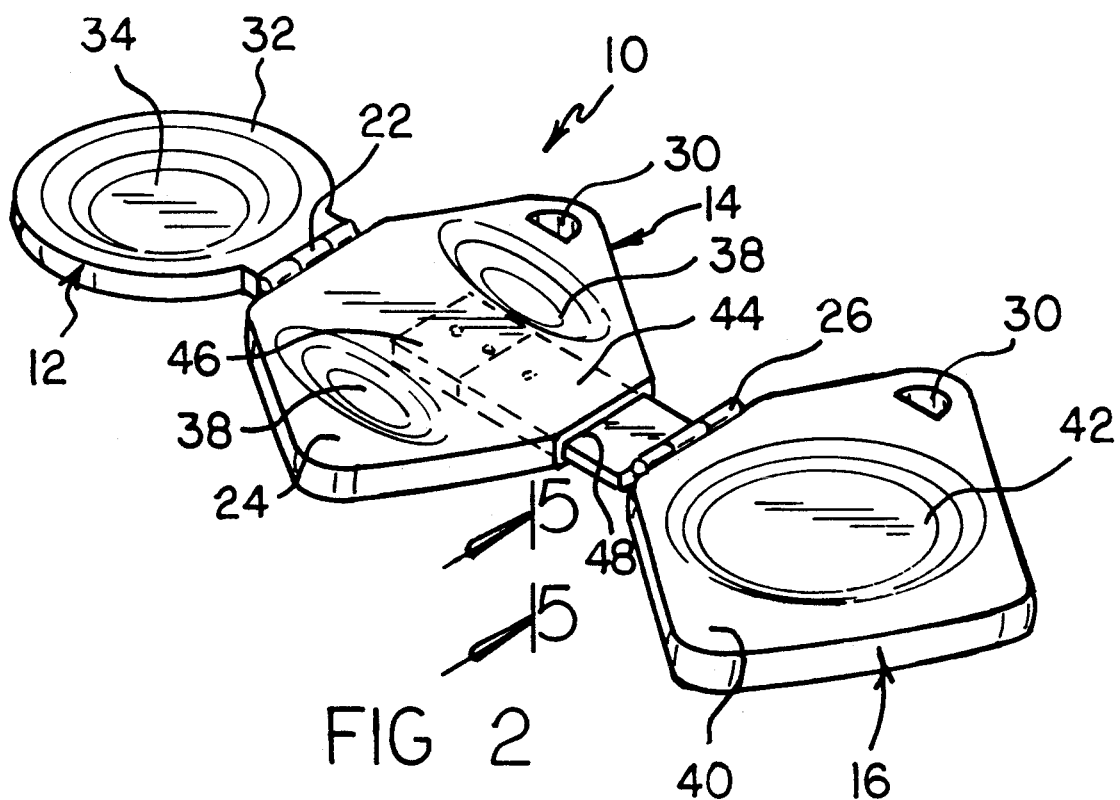
FIG. 2 is an enlarged perspective view showing the first preferred embodiment of the personal floatation device of the invention.

When floatation device 10 is unfolded as shown, for example, in FIG. 2, the upwardly facing side 32 of section 12 has a central concavity or dished portion 34 to provide a more comfortable surface for the back of the swimmer's head. Similarly, the upwardly facing surface 24 of section 14 has disposed therein a pair of spaced concavities of generally elliptical shape each designated by reference numeral 38 to comfortably received the shoulder blades protruding from the swimmer's back, and finally, the upwardly facing surface 40 of section 16 features a central concavity or dished recess 42 for comfortably receiving the buttocks of the swimmer. In accordance with the invention, concavity 42 is sized to accommodate the full rounded extent of section 12 when the sections are folded relative to each other (see FIGS. 3 and 4). By this arrangement, when the device 10 is in the fully folded condition of FIG. 4, the rear side 28 of section 12 confronts the bottom surface of concavity 42 such that section 12 nests within the concavity 42 and the flat marginal portions of surface 40 surrounding concavity engage the corresponding flat marginal portions of surface 24 surrounding elliptical concavities 38 thereby facilitating the extremely compact "suitcase like" folding arrangement of FIG. 4.

In accordance with yet another important feature of the present invention, sections 14 and 16 are joined together by longitudinally adjustable means permitting the longitudinal extent or distance therebetween to be changed to accommodate swimmers of different size. In this manner, economy of manufacturing cost can be achieved because one standard device will be able to fit many different sized swimmers i.e. a "one size fits all" goal is substantially achieved by the present invention.

More specifically, and referring now to FIGS. 3 through 6, the adjustable jonder means comprises a rectangular tongue or slide 44 received in a similarly sized and shaped recess 46 disposed longitudinally in the body of section 14 with the recess 46 having a mouth or opening 48 in the truncated flat end surface 50 of the diamond-shaped section 14. Tongue 44 which is adapted to be slidably displaced in recess 46 (and into and out of mouth 48 of recess 46) over a predetermined range terminates at its distal end in a pair of upturned bushings each designated by reference numeral 51, with bushings 51 receiving a transverse hinge pin 52 cooperating with a corresponding hinge element 54 suitably affixed to the truncated edge 56 of diamond-shaped section 16 substantially as shown. Thus, it will be appreciated that bushings 51, hinge pin 52, and cooperating hinge element 54 comprise the hinge assembly 26 permitting selective folding of section 16 relative to sections 12 and 14 as described above.

Detent locking means also are provided to affix the relative adjusted positions of tongue 44 relative to section 14. Such locking means in their preferred form comprises a series of hemispherical-shaped recesses each of which is designated by reference numeral 57 disposed in the roof of recess 46 preferably in an evenly spaced array along the central longitudinal axis of the recess 46. A hemspherically-shaped ball detent 58 sized complimentary to recesses 56 is positioned in a blind hole 60 located in the tongue's upper surface 62 proximal to end edge 64 of the tongue substantially as shown. Detent 58 is urged upwardly into locking engagement with a particular recess 46 via helical compression spring 66 to affix the relative positions of the tongue and the section 14.

In use, sections 14 and 16 are unfolded as shown in FIG. 3. Tongue 44 then may be longitudinally pulled out of recess 46 by hand using moderate force as this will be sufficient to cause the ball detent 58 to ride out of a recess 56 thereby permitting slidable displacement of the tongue 44 in the recess 46 to a new, adjusted longitudinal position whereupon the ball detent will be urged by spring 66 to engage another recess 56 thus locking the tongue into its new, adjusted relative position. The device may next be completely unfolded, placed in water and used by a swimmer to float on the surface thereof in a manner now believed apparent. Ultimately, when it is desired to place the floatation device 10 in its fully folded, compact storage condition (FIG. 4), tongue 44 is slidably displaced to its original position where end edge 64 of the tongue engages the inside end of recess 46 as this will permit section 12 to nest within concavity 42 (i.e. the central axes of sections 12, 14, and 16 should be coaxial when folding and storage is effected).

Turning now to FIGS. 7 and 8, auxiliary devices may be added to the floatation device to enhance its enjoyment in the water. Thus, in an alternatively preferred embodiment of the invention, wherein like reference numerals represent like parts already described, there is provided a storage bin 70 formed in the lateral or wing portion of section 14 opposite to that of handle forming aperture 30, which bin normally is covered by a flexible strip 72 of buoyant material (i.e. foamed plastic or rubber) fastened to the side edge 74 of section 14 by mating fabric fastener elements 76 such as that commercially marketed under the VELCRO Trademark adapted to cooperate with similar complimentary fastener elements 78 suitably affixed to side edge 74 substantially as illustrated. When removed from side edge 74, buoyant strip 72 may be affixed about a beverage container 78 indicated by dashed lines in FIG. 8 and tethered to section 14 via a string 80 suitably connected to the strip 72 and an interior wall surface of bin 70. A laterally extending slot 82 in edge 74 communicating with bin 70 may also be provided to facilitate a wider range of angular movement of tethering string 80 when float 10 is occupied by a swimmer. When not in use, string 80 may be stored inside bin 70. An additional complimentary VELCRO fastener element 84 preferably is suitably affixed to strip 72 substantially as shown to facilitate attachment to beverage container 80 and flexible tether or string 80.

The various sections 12, 14 and 16 of personal floatation device 10 may be fabricated of a buoyant material such as a closed cell foamed plastic, e.g. Styrofoam plastic; however, other known water impervious lightweight buoyant materials may be employed as well.

It should be apparent from the above description that the present invention accomplishes all of the objectives set forth by providing a new and improved personal floatation device having a plurality of hinged sections which are foldable with respect to each other to form a compact easy-to-carry article, and wherein at least two adjacent sections are connected to each other by means of a longitudinally adjustable member so as to permit the length of the floatation device to be adjusted selectively to comfortably fit swimmers of different size.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved personal floatation device comprising:
    a first section of buoyant material adapted to support a swimmer's head,
    a second section of buoyant material adapted to support the upper back of a swimmer, and
    a third section of buoyant material adapted to support the buttocks of a swimmer,
    a first hinge assembly connecting said first section to said second section, and
    a second hinge assembly connecting said second section to said third section, and
    means for adjusting the position of said second hinge assembly between said second section and said third section whereby said floatation device may be adjusted to fit different sized swimmers.

2. A new and improved personal floatation device comprising:
    a first section of buoyant material adapted to support a swimmer's head,
    a second section of buoyant material adapted to support the upper back of a swimmer, and
    a third section of buoyant material adapted to support the buttocks of a swimmer,
    a first hinge assembly connecting said first section to said second section, and
    a second hinge assembly connecting said second section to said third section,
        wherein said first, second, and third sections are aligned along the longitudinal axis of said device, wherein the hinge axis defined by the first hinge assembly is orthogonal to said longitudinal axis, and the hinge axis defined by the second hinge assembly is orthogonal to said longitudinal axis whereby said first section is adapted to be folded about said first hinge axis to overlie said second section and said third section is adapted to be folded about said second hinge axis to overlie said first and second sections, wherein said second section includes a hole therethrough proximal to one side edge thereof and wherein said third section includes a hole therethrough proximal to one side edge thereof such that said holes in said second and third sections are in registration with each other to form a carrying handle when said first section is folded about said first hinge axis to engage said second section and said third section is folded about said second hinge axis to engage both said first and said second sections.

3. A new and improved personal floatation device comprising:

a first section of buoyant material adapted to support a swimmer's head, a second section of buoyant material adapted to support the upper back of a swimmer, and a third section of buoyant material adapted to support the buttocks of a swimmer, a first hinge assembly connecting said first section to said second section, and a second hinge assembly connecting said second section to said third section, wherein said first, second, and third sections are aligned along the longitudinal axis of said device, wherein the hinge axis defined by the first hinge assembly is orthogonal to said longitudinal axis, and the hinge axis defined by the second hinge assembly is orthogonal to said longitudinal axis whereby said first section is adapted to be folded about said first hinge axis to overlie said second section and said third section is adapted to be folded about said second hinge axis to overlie said first and second sections, wherein said third section includes a concavity in one side thereof and said first section is adapted to nest within said cavity when said first section is folded about said first hinge axis and said third section is folded about said second hinge axis, and wherein said first section is round in shape and said second and said third sections are diamond shaped and substantially of the same size.

4. The invention of claim 3 wherein the apices of said second section intercepting the longitudinal axis thereof are truncated to form a pair of edges perpendicular to said longitudinal axis, and wherein said first hinge assembly is connected to one of said edges and the second hinge assembly is connected to the other of said edges whereby said hinge assemblies define hinge axes parallel to said edges respectively.

5. The invention of claim 1 wherein said second section includes a longitudinally extending recess open at the end thereof adjacent said second hinge assembly and said means for adjusting the position of said second hinge assembly includes a member received within said recess and slidable therein along the longitudinal axis of said device, and detent means on said member for engaging said second section within said recess whereby said member may be slidably adjusted longitudinally within said recess to a selected position and be maintained in said selected position by said detent means.

6. The invention of claim 5, wherein said detent means comprises a blind hole in said member received in said recess, a hemispherically shaped ball adapted to slide in said blind hole, a spring in said blind hole engaging said ball, and a plurality of longitudinally spaced, aligned hemispherical-shaped recesses in an interior wall surface defining said longitudinally extending recess and confronting said blind hole in said member.

* * * * *